United States Patent [19]
Brown, III et al.

[11] Patent Number: 5,960,166
[45] Date of Patent: Sep. 28, 1999

[54] IMAGE PRINTING SOLUTION FOR A PRINTING DEVICE

[75] Inventors: John Knox Brown, III; Cuong Manh Hoang; Christopher Lawrence Knapp; John Neil Wellman, all of Lexington, Ky.

[73] Assignee: Lexmark International, Inc., Lexington, Ky.

[21] Appl. No.: 08/131,056

[22] Filed: Oct. 1, 1993

[51] Int. Cl.$^6$ .................................................. G06K 15/00
[52] U.S. Cl. ............................................ 395/114; 395/115
[58] Field of Search ..................... 395/114, 101, 395/115, 200, 250, 275, 575, 821, 822, 825, 827, 833, 834, 843, 850, 876; 358/400, 401, 442, 444, 404

[56] References Cited

U.S. PATENT DOCUMENTS

| | | | |
|---|---|---|---|
| 3,895,184 | 7/1975 | Komura et al. | 395/114 |
| 4,912,156 | 3/1990 | Kaku et al. | 395/114 |
| 5,001,653 | 3/1991 | Buchanan et al. | 364/523 |
| 5,050,098 | 9/1991 | Brown, III et al. | 364/519 |
| 5,337,258 | 8/1994 | Dennis | 395/575 |

*Primary Examiner*—Arthur G. Evans
*Attorney, Agent, or Firm*—Ronald K. Aust

[57] ABSTRACT

A high speed printing system including a host computer, a printer controller and a print engine. The printing system can operate in a normal mode where a high level page description language is used to convey page information from the host computer to the printer controller. The system further permits rasterization of a page to be printed at the host computer and the downloading of rasterized page data to the printer controller in a form that the data can be directly serialized to the print engine.

1 Claim, 2 Drawing Sheets

IMAGE PRINTING SOLUTION FOR A PRINTING DEVICE

BACKGROUND OF THE INVENTION

This invention relates generally to printing systems and more particularly concerns the transmission of page information from a host computer to a page printer for printing.

In a typical host computer and page printer arrangement, a page to be printed is described in a high level page description language and transmitted from a host computer to a page printer which includes a printer controller and a print engine. The printer controller interprets and processes the high level language commands to create a rasterized page made up of page data for printing. The rasterization can be of a full page or a part of a page, with subsequent parts of the page being rasterized later. The rasterized page data is then serialized to the print engine to effect the printing onto a print medium such as paper.

Usually, a microprocessor in the printer controller executes associated interpreter software for interpreting the high level page description language commands and also calls upon resources stored in the printer (at least temporarily) such as fonts for rendering characters in the rasterized page data.

The pages to be printed are created in application programs run on the host computer, such as drawing programs and word processing programs. Printer drivers are provided for each application to produce descriptions of pages to be printed in high level page description languages such as Hewlett-Packard Company's PCL language or Adobe Systems' PostScript language. Becoming prevalent today are operating environment programs such as the IBM OS/2 operating environment and the Microsoft Windows operating environment, which provide an intermediate interface with application software. These programs produce a graphical device interface for viewing or printing pages produced by the applications. In this way, only a single driver for each high level page description language, suitable to communicate with the graphical device interface of the operating environment, need be provided regardless of the number of application programs.

It is a general objective of the present invention to improve the speed of printing a page from the time it is selected for printing at the host computer to the time that the print engine actually produces the printed page.

One previous attempt to do this was to provide, at the host computer, additional hardware (in the form of a circuit card) and software to rasterize the page to be printed at the host computer rather than at the printer. The additional hardware is then capable of operating through a dedicated connection to the print engine to directly drive printing of the page. In the case of a laser printer, for example, the printer's laser is directly driven from the additional hardware at the host computer. This solution has the drawback of adding considerable expense to the computer/printer system.

In accordance with the invention, we provide a high speed printing system which does not require special host computer hardware nor a direct connection from such special host computer hardware to the print engine. We provide, for printing systems of the foregoing type (employing a host computer, a printer controller, and a print engine), a printing system which can operate in a normal mode where a high level page description language is used to convey page information from the host computer to the printer controller. The inventive system further permits rasterization at the host computer of a page to be printed and the downloading of rasterized page data to the printer controller in a form such that the data can be directly serialized to the print engine.

Advantageously, a microprocessor in the host computer, which may operate considerably faster than a microprocessor in the printer controller, can perform the rasterization of the page by drawing on resources such as font data available at the host computer, without the need to download some or all of such resources to the printer in order for them to be available during rasterization. Also, the inventive technique minimizes the number of conversions of data required in moving from the step of selecting printing of a page at the host computer to the production of the printed page at the print engine.

In practicing the invention, advantages can also be gained from compression of the rasterized page data sent from the host computer to the printer controller, with the page data being decompressed "on the fly" during serialization to the print engine.

Further advantages of the invention will become apparent upon reading the following detailed description and upon reference to the drawings.

DETAILED DESCRIPTION

In the inventive image printing system, pages to be printed are rasterized on a host computer. In this way, the same resources that are available for use on a display associated with the host computer are available for the printed output, increasing the likelihood of matching what is seen on the screen with what is printed by the printer. Furthermore, data transformation is minimized during the print process, which increases the speed of printing.

Figure 1:
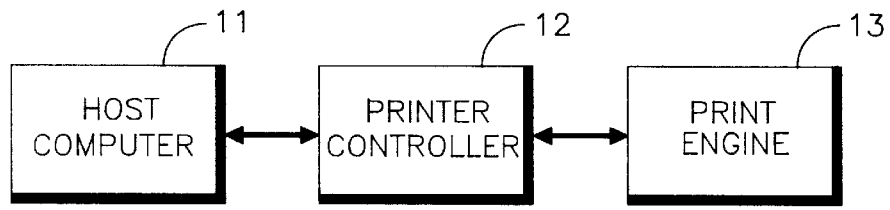
FIG. 1 is a block diagram of the computer and printer elements of a printing system.

With reference to FIG. 1, the present printing system includes a microprocessor-based host computer 11 which communicates with a microprocessor-based printer controller 12, which in turn communicates with a print engine 13 for producing the printed page. The printer controller 12 is capable of operating in an image printing mode in which page data in a form for serialization to the print engine is received from the host computer 11. Host computer 11 executes a driver program to produce the page data in a form for serialization. References herein to page data "in a form for serialization" mean page data in the form produced by the printer controller in processing and interpreting high level language commands which it receives to rasterize a page. The serialization process is deemed to include any "on the fly" decompression or image enhancement performed by printer controller hardware or software on the rasterized page data.

When a user of the host computer 11 executes an application program in a manner to produce a page to be printed, the contents of that page are described as a set of data in a form used by the application program. In the absence of an operating environment such as Microsoft's Windows, a printer driver for the application program is then executed by the host computer 11 to convert the page description information to the requisite page data. In order to produce page data in a form for direct serialization, a driver specific to the application software could be employed. Such an approach would require specialized printer drivers for every application used to produce printed pages.

Preferably, the present invention is implemented on a host computer running application programs in the Microsoft Windows operating environment. In this way calls for printing by the-user result in the provision of page information to a printer driver in a single host environment format regardless of the number of applications running in that environment. A single driver is then provided at the host computer 11 to rasterize a page to be printed based upon page information in the single host environment format.

Figure 2:
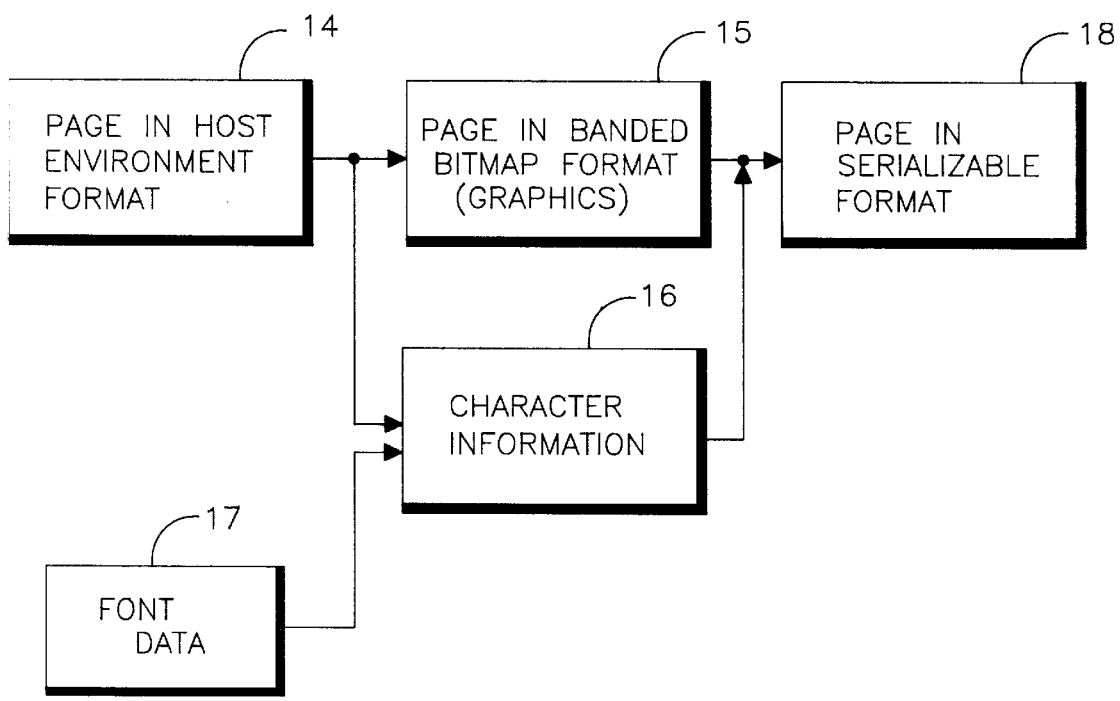
FIG. 2 is a diagrammatic illustration of the process for the rasterization of data at the host computer in accordance with the present invention.

With reference to FIG. 2, the operation of the host computer in executing the printer driver software is diagrammatically illustrated. The driver receives the page information in the host environment format (14) and renders the graphical information into a page bit map format (15). Since sufficient memory for rasterizing an entire page is often unavailable at the host computer, the page is usually rendered in banded bit map format. Strips, or bands, of the page to be printed from top to bottom are produced one at a time or two at a time in order to conserve the memory needed to hold the bit map data at any given moment. As required, character information (16) is provided by using character position and font information from the page description in the host environment format. This character position and font information is combined with font data (17) in order to provide the character bit map information, which is added to the graphical bit map information produced.

Many printer drivers for operation on host computers such as 11 have been produced for creating page data both in bit map format and in a high level page description language. Examples include drivers which interface with the Microsoft Windows graphical device interface to produce page data in Hewlett-Packard PCL format and Adobe PostScript format. To the extent that conventional printer drivers such as these do not produce bit map format data, the high level page description language produced by these drivers is converted to bit map format data in the printer controller. In any event it is well known to produce bit map format data from page information presented in graphical device interface format from an operating environment such as Microsoft Windows.

Returning to FIG. 2, once the bit map format data describing the page is produced (15, 16), the printer driver operating in the host computer 11 further converts the data to exactly the form of page data (18) required for direct serialization to the print engine 13. In one form of printer implementing the present invention, the serializable form of the data is "blocked" and compressed. The compression reduces the amount of memory required for storing the page data at the host computer and also reduces the transmission time in sending the data from the host computer to the printer controller. Blocking the page data divides the bands of raster image into a number of blocks, which in turn can provide some advantages in handling the page data. The driver code for producing the page in serializable format is substantially the same as that in the printer controller, which would vary for different types of systems, and does not form a part of the present invention.

In normal operation, when not interfacing with the printer in image mode, the host computer 11 sends page information to the printer controller 12 in the form of a high level page description language such as a level of Hewlett-Packard's PCL language or Adobe's PostScript language. Depending upon the form of the high level language describing the page, the printer controller 12 performs the necessary operations to rasterize, block and compress the page data. Thus, placing the page in serializable format (18 in FIG. 2) at the host computer 11 calls for performing substantially the same rasterization process performed by the printer controller when operating in normal mode, whatever that might be for the particular printer controller.

Figure 3:
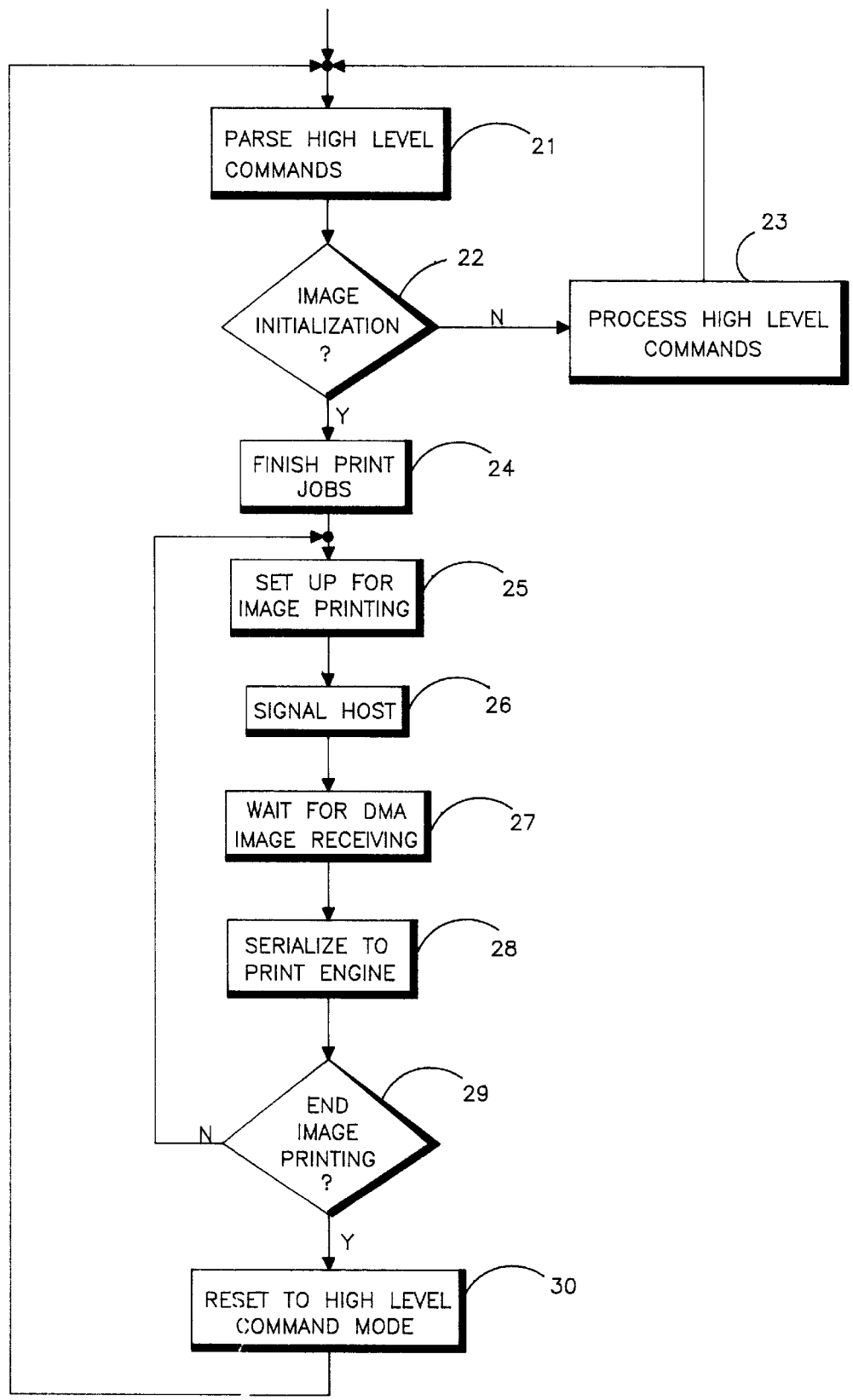
FIG. 3 is a flowchart of the operation of the printer controller microprocessor in selectively moving between a mode of interpreting high level page description language commands and a mode in which page data in a form ready for serialization can be received by the printer controller.

With reference now to FIG. 3, the operation of the printer controller 12 to shift into the image printing mode is described. In normal operation, the printer controller 12 parses high level commands (21), in order to shift between high level language operating modes, if more than one such mode is accommodated by the printer controller; and the printer controller also recognizes all of the commands within a page description language for rendering the correct image which is to be printed. As the printer controller is parsing the high level commands, it determines (22) if an image initialization command has been received. If not, the controller continues to process (23) the high level commands.

If an image initialization command is received, as will be described in more detail hereinafter, the controller finishes any print jobs in progress under the high level language (24). The printer controller 12 then sets up for image printing (25). This entails various housekeeping functions as well as setting up to have page data received from the host computer placed directly into a location in memory from which it can be directly serialized to the print engine.

After setup, the controller 12 signals the host computer (26) so that the page data can be directly sent from the host computer to the printer controller. For the form of printer implementing the present invention, the transfer of data from the hardware port receiving data from the host computer to the controller memory is accomplished by direct memory access (DMA) hardware which may be imbedded in the processor or found elsewhere in the controller. Therefore, in the illustrated flow, the controller 12 waits (27) for the DMA hardware to transfer the image data into the controller memory. The printer controller 12 then serializes the page data to the print engine for printing, assembling the blocks in the correct order, and decompressing the data on-the-fly. The serialized data bits may be applied unchanged to the printer mechanism or may be examined logically with respect to data surrounding each data bit and modified to smooth lines (often termed enhancement of resolution).

If this is the end of the image printing session (29), as signaled by the receipt of a mode change command from the host computer 11 , the printer controller resets to the appropriate mode of operation to receive high level commands and perform normal rasterization and serialization functions (30).

If there is further image printing, the printer controller returns to set up for receiving (25) the next image data. Multiple pages of image data in serializable format can be received and printed in this mode.

A special "Set Initial Conditions" (SIC) command is used to enter image mode on the printer:

ESC [K <byte count>0x06 0x31 0x09

Typically, <byte count> is 0x0300 (to indicate 3 bytes). The host driver will send this command at the start of each image print job. Another SIC command terminates each job:

ESC [K <byte count>0x06 0x31 0x00

This command switches the printer back to its default datastream interpreter.

Note that while this mode is active, multiple pages can be received and printed.

At the start of every page, the image host driver first sets up page parametrics, such as print resolution, top and left margins, etc., with the Set Page Parametrics command, described as follows:

ESC [p <byte count> <resolution> <left margin> <top margin> <tiles> <duplex> <copies>

Each field in this command is two bytes long. They are described below:

<resolution>- selects either 300 or 600 dots per inch (DPI) resolution

<left margin>- left logical no-print zone in pels

<top margin>- top logical no-print zone in pels.

<tiles>- number of tiles, or blocks, into which the page is divided. This number is used for decompression purposes <duplex>- specifies simplex or duplex mode (with long or short edge binding); also provides the ability to start printing on the next front side or back side of a page. Each byte of this two-byte, optional parameter is interpreted separately:
  Byte 1 - mode selection
    0x00 - no change in simplex/duplex setting
    0x01 - switch to duplex mode, long-edge binding
    0x02 - switch to duplex mode, short-edge binding
    0x04 - switch to simplex mode
  Byte 2 - surface selection
    0x00 - no command taken
    0x01 - advance to a front surface
    0x02 - advance to a back surface <copies>- specifies number of copies of each page to print To set paper source and size, the image printing system may use commands in the form of Hewlett-Packard PCL paper source and size selection commands.

The image printing host driver sends data to the printer in the form of whole-page compressed bitmaps, which are normally broken up into several pieces for the download process. These pieces are sent one at a time, with the image graphics command, described as follows:

ESC [w <byte count> <data>

The <byte count> field is 4 bytes long, and indicates how many bytes are in the <data> field. Any number of these commands may be sent per page. The <data> from each command is placed into memory contiguously, thus building the compressed bitmap information for the entire page in one block of printer memory.

When the image driver has sent all the compressed bitmap data, it sends a form feed (0x0C) to launch the page. It can then start another page with the Set Page Parametrics command, or exit image mode with the SIC command described above.

The image printing solution can be used on every link to the host computer that the printer supports. However, if a parallel link (the standard personal computer to peripheral parallel interface) is used, a high speed parallel interface allows a faster ("high speed") data-transfer rate for transmission of the <data> part of the image graphics command.

High speed mode is possible because the image printing emulator in the printer code will bypass the normal computer system output driver for the printer and the normal printer input sequence, which is usually a multi-buffering data input technology.

The data bytes sent by the host go directly into their final memory location, rather than passing through link buffers first. A special parallel handshake, described by the following signal configuration (with reference to the lines of the parallel interface) is used to start high speed mode:

| ERROR* | Low  |
|--------|------|
| BUSY   | Low  |
| PE     | Low  |
| SELECT | High |
| ACK*   | High |

Though ERROR* is active, this configuration will not occur in other error situations. As image data is strobed in, the BUSY and ACK* lines will change state, but the other signals will retain the settings as shown above during data transfer.

For fastest performance, the image driver does not check the BUSY signal between bytes of data.

When the data from the image graphics command is finished being sent to the printer, the interface returns to the normal parallel handshake.

The following datastream command sent by the image host driver before any pages are sent enables high speed mode:

Esc $ f

We claim:

1. A printing system comprising:
   a. a host computer including:
      i. means for rasterizing a page to be printed to produce page data in a form that it can be directly serialized by a printer coupled to the host computer,
      ii. means for sending image initialization commands to a printer coupled to the host computer, and
      iii. means for sending page data in said form to a printer coupled to the host computer after the image initialization commands; and
   b. a printer coupled to the host computer having a print engine and a printer controller with buffer memory, including:
      i. means for receiving and recognizing image initialization commands from the host computer,
      ii. means for receiving page data, in a form that it can be directly serialized, from the host computer after the image initialization commands,
      iii. means for storing said page data in buffer memory in the form it is received, and
      iv. means for serializing the page data directly from the buffer memory to the print engine;
   wherein the image initialization commands comprise a command recognizable by the printer controller as a command to enter into a mode for receiving page data in a form that page data can be directly serialized, and a parametrics command for this mode of printing which includes information concerning resolution and margins.

* * * * *